United States Patent [19]
Caldwell

[11] Patent Number: 4,703,625
[45] Date of Patent: Nov. 3, 1987

[54] TURBOCHARGER CONTROL SYSTEM

[75] Inventor: Roland B. Caldwell, Worthington, Ohio

[73] Assignee: Ranco Incorporated, Dublin, Ohio

[21] Appl. No.: 705,106

[22] Filed: Feb. 25, 1985

[51] Int. Cl.⁴ ............................................. F02D 23/00
[52] U.S. Cl. .................................... 60/602; 137/81.1; 137/116.5
[58] Field of Search ......................... 137/81.1; 60/602; 137/116.5

[56] References Cited

U.S. PATENT DOCUMENTS

| | | | |
|---|---|---|---|
| 1,903,338 | 4/1933 | Horne | 137/116.5 |
| 2,148,230 | 2/1939 | Berger | 60/602 |
| 2,376,199 | 5/1945 | Shoulds | 230/11 |
| 2,544,520 | 3/1951 | Ball | 137/31.1 |
| 2,596,178 | 5/1952 | Seeler | 137/81.1 |
| 2,608,200 | 8/1952 | Stockman | 137/81.1 |
| 3,035,408 | 5/1962 | Silver | 60/602 |
| 3,125,111 | 3/1964 | Daly | 137/102 |
| 3,611,711 | 10/1971 | Mueller | 60/13 |
| 3,987,131 | 10/1976 | Hisatomi et al. | 261/39 A |
| 4,108,197 | 8/1978 | Brakebill | 137/81.1 |
| 4,177,224 | 12/1979 | Yamanaka et al. | 261/39 A |
| 4,283,912 | 8/1981 | Cholvin | 60/602 |
| 4,391,290 | 7/1983 | Williams | 137/81.1 |
| 4,442,672 | 4/1984 | Fischer | 60/602 |
| 4,476,682 | 10/1984 | McInerney | 60/602 |

FOREIGN PATENT DOCUMENTS

| | | | |
|---|---|---|---|
| 481835 | 3/1952 | Canada | 137/81.1 |
| 0035691 | 9/1981 | European Pat. Off. | |
| 846063 | 8/1952 | Fed. Rep. of Germany | 137/81.1 |
| 3107935 | 2/1982 | Fed. Rep. of Germany | 60/602 |
| 497582 | 9/1919 | France | 137/81.1 |
| 157451 | 10/1952 | Switzerland | 137/81.1 |
| 2039610 | 8/1980 | United Kingdom | |

Primary Examiner—A. Michael Chambers
Attorney, Agent, or Firm—Watts, Hoffmann, Fisher & Heinke Co.

[57] ABSTRACT

An altitude compensating turbocharger control system including a boost regulator 54 for modifying a wastegate signal as a function of turbocharger output pressure and ambient pressure. The regulator includes a housing 52 that mounts a valve assembly 60 including a controller 98 for controlling the communication of an input chamber 94 with an output chamber 96 and the communication of the output chamber 96 with an ambient pressure port 82. The housing also mounts an aneroid capsule 62 and a force transmitting arm 70 for transferring and amplifying ambient pressure related forces generated by the aneroid capsule 62 to the controller. The pressure in the output chamber is a function of both input pressure and the atmospheric pressure sensed by the aneroid capsule and is communicated via a port 84 to a wastegate actuator 30 which opens and closes a wastegate valve 28. Changes in atmospheric pressure sensed by the aneroid capsule causes the controller to modify the pressure in the output chamber to compensate for a change in biasing force on a wastegate actuator diaphragm 34 that occurs as a result of changes in atmospheric pressure.

26 Claims, 3 Drawing Figures

TURBOCHARGER CONTROL SYSTEM

DESCRIPTION

1. Technical Field

The present invention relates generally to turbo charging and in particular to an altitude compensating wastegate controller for a turbocharged internal combustion engine.

2. Background Art

The use of turbochargers to increase the horsepower and torque of an internal combustion (I.C.) engine is well known. In the past, turbochargers were primarily used in truck and aircraft applications. Recently turbocharging has become a popular method for increasing the horsepower of small automobile engines. With the addition of an exhaust driven turbocharger a relatively small fuel efficient engine can be used in an automobile to provide economical operation during normal driving while providing additional horsepower and torque during acceleration and/or full throttle operation.

In most, if not all exhaust driven turbocharger installations, a wastegate is employed to limit the maximum boost pressure developed by the turbocharger. Typically, the wastegate comprises a valve disposed in the exhaust flow path and an actuator for moving the valve. The actuator moves the valve between opened and closed positions in response to boost pressure. In the open position, the flow of the exhaust gas is diverted around the turbine housing whereas, in the closed position, all of the exhaust gas travels through the turbine housing.

The wastegate actuator usually comprises a spring biased diaphragm operatively connected to the valve. One side of the diaphragm is exposed to ambient pressure while the other side receives a signal pressure related to the boost pressure. The combination of the spring force and the ambient pressure applied to the diaphragm urges the valve towards a closed position at which all the exhaust flow is directed to the turbine housing.

The boost pressure developed by the turbocharger is communicated to the other side of the diaphragm. When a predetermined boost pressure is developed (usually determined by the spring biasing force), the force generated by this pressure overcomes the spring force and drives the diaphragm together with the valve to its open position, allowing exhaust gas to bypass the turbine housing, hence reducing or limiting the rotational speed of the turbine. Because one side of the diaphragm is exposed to ambient pressure, the total biasing force on the diaphragm (the combination of the spring force and ambient pressure) will vary with changes in altitude. In particular, as the altitude increases, the force applied by ambient air pressure will be reduced and as a result, the maximum boost pressure developed will decrease since a lower boost pressure will be sufficient to overcome the lower biasing force on the diaphagm. In short, the diverting valve will open at a lower boost pressure. Consequently, with prior art turbocharger controls, the turbocharger is prevented from developing sufficient boost for the engine to obtain its maximum horsepower and torque at higher altitudes.

Controls have been suggested in the prior art to compensate for changes in altitude. In the aircraft environment these altitude compensating controls have been rather complex and costly and could not be readily adapted to automobile turbocharging.

Altitude compensating turbocharging controls have also been proposed for automobile applications. Most of these controls, however, rely on a pressure modulating mechanism which allows a portion of a wastegate signal pressure to bypass the wastegate actuator thus reducing the applied pressure to the diaphragm. The amount of modulation varies in accordance with the altitude. As the altitude increases, more of the signal pressure is bypassed allowing the turbocharger to increase its output in order to actuate or open the wastegate valve. These modulating controls in effect, consume intake pressure since the pressurized air continually bypasses the wastegate actuator.

Some of the proposed altitude compensating controllers utilize an aneroid bellows as an altitude sensor. In many of these controllers, movement in the aneroid bellows is relied upon to directly move the modulating valve. Since movement in the aneroid bellows is normally quite small for small changes in altitude, these proposed controllers were prone to error.

DISCLOSURE OF INVENTION

The present invention provides a new and improved turbocharging system for an automobile or truck engine that includes a control system that automatically compensates for changes in atmospheric or barometric pressure. With the present invention, a turbocharger will attain a predetermined maximum boost pressure regardless of the altitude at which the engine is operated.

In the preferred and illustrated embodiment, the control system comprises a pneumatically operated wastegate controller for controlling the communication of exhaust gas to a turbine housing of an exhaust driven turbocharger and a boost regulator for controlling a signal pressure communicated to the wastegate controller. The wastegate signal generated by the regulator is a function of the sensed barometric pressure and turbocharger output pressure.

In accordance with the invention, the boost regulator comprises a housing mounting an aneroid capsule, a valve assembly for controlling the wastegate signal pressure (communicated to the wastegate actuator) and a force transmitting member for amplifying and transferring forces generated by the aneroid capsule to the valve assembly. Unlike the prior art, changes in atmospheric pressure sensed by the aneroid capsule are manifested as changes in a biasing force on a valve and not as a direct displacement of the valve itself by the aneroid element.

The valve assembly defines an input port for receiving an input signal related to intake manifold pressure, an output port connected to the wastegate actuator and an ambient pressure port. An input chamber forming part of the assembly receives the input signal via the input port. In the preferred and illustrated embodiment, the input signal is provided by a direct connection between the regulator input port and the intake manifold of the I.C. engine. The assembly also defines an output chamber communicating with the output port. The pressure signal developed in the output chamber (which is communicated to the wastegate actuator) is a function of the turbocharger output and the barometric pressure sensed by the aneroid capsule.

The assembly includes a controller valve movable between three positions. In one position the controller valve isolates the input chamber and the output chamber from each other and from ambient pressure; in a second position it communicates the input chamber with the output chamber; and in a third position it communicates the output chamber with ambient pressure.

In accordance with the invention, the controller valve moves in response to the application of unbalanced forces exerted by: (1) the input pressure in the input chamber; (2) the pressure in the output chamber; and, (3) an external force generated by the aneroid capsule which is a function of barometric pressure. In normal operation, the controller valve adjusts the pressure in the output chamber until the applied forces are balanced. When the forces are balanced, the valve moves to its first position at which the input and output chambers are sealed from each other and from the atmosphere. As indicated above, the input chamber receives boost pressure from the turbocharger output. The controller valve responding to both the turbocharger boost pressure and the biasing force exerted by the aneroid capsule develops a static wastegate signal in the output chamber that is a function of both boost pressure and barometric pressure.

The aneroid capsule, which preferably comprises a sealed bellows, generates an expansion force in response to decreased barometric pressure. The expansion force is transferred to the controller valve by the force transmitting member and urges it towards its third position. As indicated above, when the valve controller is in its third position, the output chamber is communicated with the ambient pressure port. In order to balance the external biasing force generated by the aneroid capsule, and move the controller valve to its first position where the input and output chambers are isolated requires an increase in input signal pressure and hence increased turbocharger output.

As explained above, the output pressure applied to the wastegate actuator urges the wastegate valve towards the open position. This opening force is countered by a spring and ambient pressure applied to the other side of the actuator diaphragm. As barometric pressure decreases with increasing altitude, the countering force applied to the diaphragm by ambient pressure is reduced. However, as the barometric pressure decreases, the aneroid element biases the controller valve towards the third position and hence reduces the wastegate signal pressure for a given turbocharger output. In the preferred embodiment, the reduction in the wastegate signal pressure as the altitude increases, compensates for the reduction in force exerted on the diaphragm by the ambient pressure.

According to the feature of the invention, the controller valve which is actuated in response to a sensed change in the force exerted by the aneroid capsule, also operates to minimize the degree of deformation in the capsule. A change in atmospheric pressure causes an incremental change in capsule extension but the valve controlling system operates to return the capsule to its original configuration as the controller valve position is adjusted. Thus the capsule shape remains essentially unchanged throughout the range of operation of the control system.

The degree of capsule extension changes incrementally when the capsule force is first applied to the controller valve. The boost pressure is utilized to produce a mechanical force which is applied to the aneroid capsule to oppose the incremental capsule extension. This feedback force returns the capsule to its initial configuration so that the degree of capsule extension is unchanged for any given atmospheric pressure in the operational pressure range.

In the preferred and illustrated embodiment, the control system is constructed and arranged so that the system is formed from relatively few parts which are compactly arranged and easily assembled. Unlike prior art boost controls, boost pressure is not continually bled to atmosphere in order to reduce a pressure signal to the wastegate actuator. In the disclosed regulator, static pressures are maintained in the output chamber of the regulator and hence intake air is not consummed by the turbocharger control thus increasing engine efficiency.

In the preferred and illustrated construction, the regulator includes a housing which encloses the aneroid capsule and the force transmitting member. According to a feature of this embodiment, the valve assembly is mounted to the housing and includes an operating member preferably a rod, that extends into operative engagement with the force transmitting member. The valve assembly includes a port body defining input, atmospheric and output ports and an enclosure member or casing which encloses the valving components. A control diaphragm which supports the valve controller is clamped between and sealingly engages the port body and a flange formed on the casing. The subassembly formed by the casing, port body and valving components, can be assembled separately and then mounted to the regulator housing. Relatively inexpensive fasteners such as rivets can be employed for securement. The port body and valve enclosure can be easily molded and mass produced and hence, the regulator can be manufactured rather inexpensively.

According to another feature of the invention, a skirted seal is used to seal an opening in the valve casing through which the operating rod interconnects the valving components and the force transmitting member. With the disclosed construction, seal friction is minimized since flexure in the skirt is relied on to maintain the seal as the operating member reciprocates. Since the seal is not required to slide relative to the operating member, sliding friction is substantially eliminated.

According to another feature of the invention, the force transmitting member which transfers forces between the aneroid capsule and controller valve defines different length moment arms to effect the force transfer between the aneroid capsule and the controller valve, producing an amplification of the capsule generated force. In the disclosed embodiment, the force transmitting member comprises a lever arm pivotally connected near one end to the regulator housing. The aneroid capsule applies forces to the lever arm a spaced distance from the pivot. The controller valve, in turn, is connected to the lever arm at a location intermediate the pivot and the aneroid capsule connection. As a result, the moment arm defined between the pivot and the controller valve is shorter than the moment arm defined between the pivot and the aneroid capsule. The amplification ratio produced by the lever arm is a function of the ratio of moment arms and therefore can be adjusted. Unlike the prior art, forces generated by the aneroid capsule are not directly coupled to the controller valve in a one-to-one ratio. It is believed that with the disclosed arrangement, a more stable and effective control of the wastegate signal pressure is achievable.

Additional features of the invention will become apparent in the following description of the preferred embodiments and from the drawings which form part of the specification.

BEST MODE FOR CARRYING OUT THE INVENTION

Figures 1, 2:
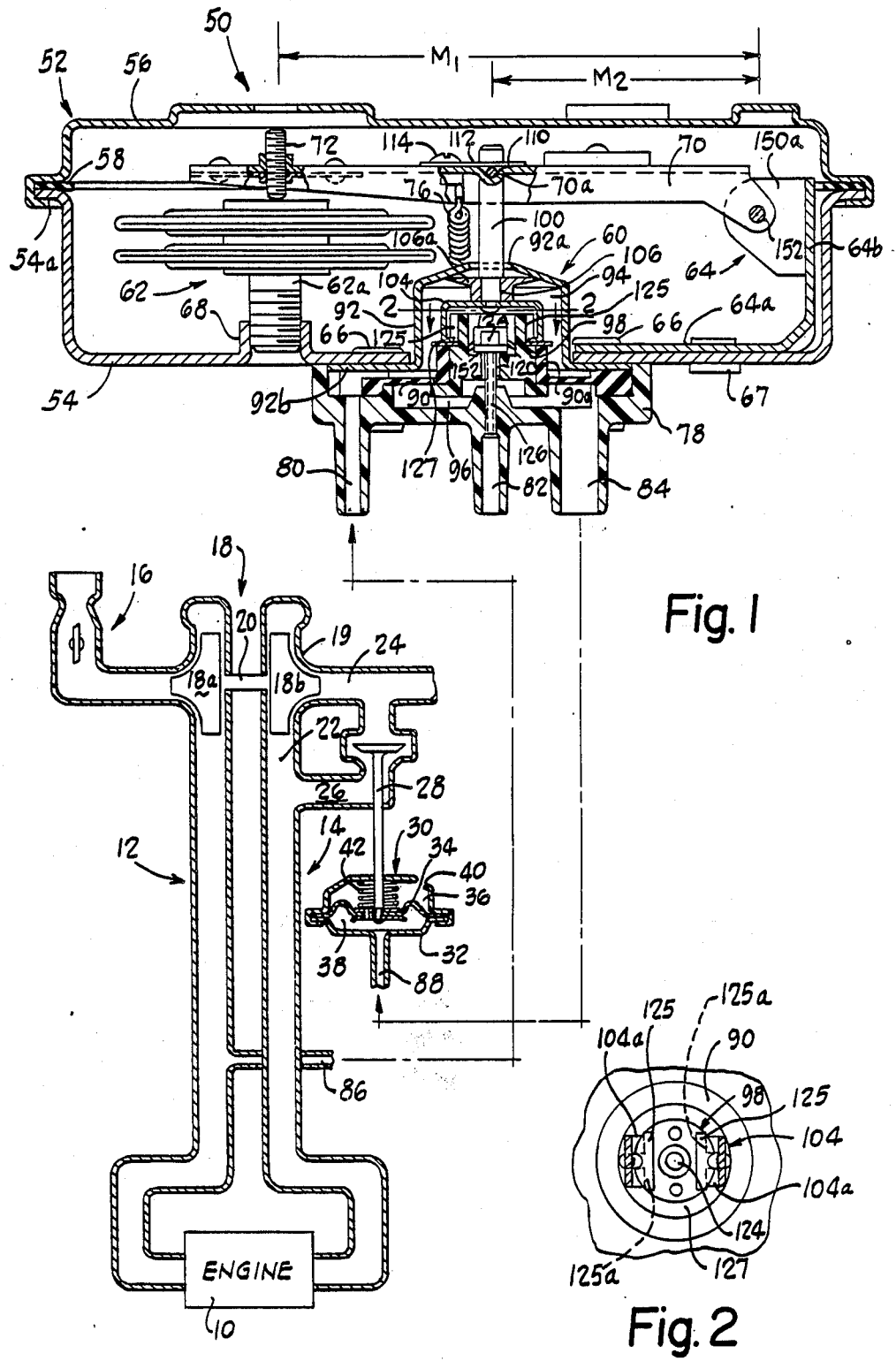
FIG. 1 illustrates a turbocharger control system including a boost regulator shown in section, constructed in accordance with the preferred embodiment of the invention.
FIG. 2 is an enlarged, fragmentary view of the boost regulator as seen from the plane indicated by the line 2—2 in FIG. 1; and, FIG. 3 is an enlarged plan view of the boost regulator with a top cover removed to show interior detail.

FIG. 1 illustrates the overall construction of a turbocharger control system embodying the present invention. The pertinent components of an internal combustion engine are shown schematically and include the engine block 10 and intake and exhaust systems 12, 14, respectively. In the illustrated embodiment, a carburetor, schematically illustrated, is indicated by the reference character 16. The present invention however is adaptable to other fuel systems such as fuel injection.

A turbocharger 18 includes a compressor wheel 18a mounted in the intake system and an exhaust turbine 18b rotatable within a turbine housing 19 disposed in an exhaust path. The wheel 18a and turbine 18b are coupled together by a common shaft 20. As is known, the exhaust turbine is driven by exhaust gas traveling through the exhaust path defined by conduit portions 22, 24. The turbine rotates the compressor wheel which compresses the intake air thus increasing the charge density that is admitted into an engine cylinder (not shown) during an intake stroke. The rotational speed of the turbocharger and hence its output pressure is determined by the exhaust flow rate through the turbine housing 19. It should be apparent that the rotational speed of the turbocharger increases with increasing engine speed and/or with increasing throttle position.

In order to prevent damage to the turbocharger or engine that would be caused if the turbocharger was allowed to rotate at excessive speed, a bypass conduit 26 is provided which diverts exhaust gas around the turbine housing 19. The flow of exhaust gas via the bypass conduit is controlled by a wastegate valve 28. When the valve opens, as shown in FIG. 1, at least a portion of the exhaust gas bypasses the turbine housing 19 thus reducing or limiting turbine speed.

Movement in the wastegate valve 28 is controlled by a wastegate actuator 30. In the illustrated embodiment, the actuator includes a housing 32 that mounts a diaphragm 34. The diaphragm divides the interior of the housing 32 into upper and lower chambers 36, 38. The upper chamber is maintained at ambient pressure by a port 40 formed in the housing 30. The wastegate valve 28 is connected to the diaphragm such that movement of the diaphragm produces attendant motion in the wastegate valve. A biasing spring 42 acting between the housing and the diaphragm urges the wastegate valve towards its closed position at which exhaust flow through the bypass conduit 26 is blocked.

The lower chamber 38 receives a wastegate signal which is a function of the turbocharger boost pressure (generated by the rotation of the compressor wheel 18a) and sensed atmospheric pressure. The wastegate signal applies a force to the diaphragm urging it upwardly. This upward force is opposed by the ambient pressure force exerted on the top of the diaphragm and by the spring force 42. When the wastegate signal exceeds the ambient and spring forces, the wastegate valve opens and allows exhaust gas to bypass the turbine housing 19 (via conduit 26) to prevent further speed increase of the turbine.

The wastegate signal communicated to the lower chamber 38 is controlled by a barometric sensitive regulator 50. In the preferred embodiment, the regulator monitors boost pressure and atmospheric pressure and generates a wastegate signal that is a function of both pressures. In accordance with the invention, the wastegate signal is reduced as the atmospheric pressure decreases for a given boost pressure to compensate for the reduction in biasing force exerted on the top of the diaphragm by the ambient pressure.

The regulator 50 includes a housing 52 including a base 54 and a cover 56. The base 54 includes an outwardly extending flange 54a about which the cover 56 is crimped to fix its position. A gasket 58 is clamped between the cover and base 54, 56. The base 54 mounts a valve assembly indicated generally by the reference character 60, an aneroid capsule 62 and a pivot mount 64. The valve assembly and pivot mount are secured to the bottom of the base by a plurality of rivets 66, 67.

The aneroid capsule 62 includes a threaded stud 62a that is threadedly received by a boss 68 formed in the bottom of the base 54. A force transmitting arm 70 is pivotally connected to the pivot mount 64 at one end and abuttably engages the top of the aneroid capsule 62 at its other end. Contact between the left end of the arm 70 and the top of the capsule is effected through an adjustment screw 72. An access hole 74 in the cover 56 allows external adjustment of the screw 72. A tension spring 76 biases the arm 70 downwardly into contact with the capsule 62 and also inhibits transverse movement in the arm.

The valve assembly 60 includes structure or a body 78 depending from the base 54 that defines an input port 80, an ambient vent port 82 and an output port 84. In the illustrated embodiment, the input port 80 is connected to the intake system 12 by a conduit 86. The output port 84 communicates with the lower chamber 38 of the wastegate actuator 30 through a conduit 88. The valve assembly 60 mounts a flexible diaphragm 90 between the structure 78 and an upper valve assembly cap or casing 92. The diaphragm 90 is sealingly clamped between the cap 92 and the structure 78. An input chamber 94 is defined between the cap 92 and the diaphragm 90. An output chamber 96 is defined between the diaphragm 90 and the port structure 78 and communicates with the output port 84.

The diaphragm 90 carries a controller valve member 98 which controls the communication of the input and output chambers 94, 96. The controller member 98 is connected to the arm 70 by an actuating rod 100 that extends downwardly. A U-shaped clip 104 attached to the bottom of the rod 100 is clamped to the controller member 98. The rod 100 extends through an opening 92a formed in the cap 92. A seal 106 prevents air leakage out of the input chamber 94 through the opening 92a. The top of the actuating rod is pivotally connected to the arm 70. A transverse pivot pin 110 is pivotally secured in a V-shaped recess 70a formed in the arm 70 and maintained in position by a retaining plate and mounting screw 112, 114. It should be apparent that expansion of the capsule 62 causes an upwardly directed force to be applied to the controller member 98 by way of the actuating rod 100.

The seal 106 includes a flexible skirt 106a which operates to maintain the seal around the opening 92a (to prevent leakage into the chamber 94) as the operating rod 100 reciprocates. Since flexure in the skirt 106a is relied on to maintain the seal, very little if any friction is generated during control valve operation as would be the case if a slidable type seal were used.

The controller member 98 comprises an annular body and defines a central passage 120. An upwardly extending lip 122 is formed at the upper end of the passage 120 and forms a seat for a valve element 124. The valve element 124 is carried centrally by the diaphragm 90. Alternately, the valve element may be an integrally formed button molded as part of the diaphragm 90. Referring also to FIG. 2, the controller includes a pair of spaced, upwardly extending semi-circular legs 125. The legs 125 extend through complementally formed apertures in the diaphragm 90. Slots 125a formed near the base of each leg receive the tips of prongs 104a formed at the lower ends of the U-shaped clip 104. A retaining ring 127 is captured under the clip 104 and clamps the diaphragm against a shoulder 98a formed in the controller. A convolution 90a formed in the diaphragm 90 tightly surrounds the center region of the controller 98. In effect the controller 98 is locked to the diaphragm so that movement in the diaphragm causes attendant movement in the controller.

As seen in FIG. 1, the passage 120 loosely receives a tube 126 that communicates with the ambient pressure port 82. The top of the tube 126 defines a vent opening that is opened and closed by the valve element 124. The loose fit between the port 120 and the tube 126 supports air flow from the output chamber 96 into the tube 126 whenever the controller member 98 moves upwardly to lift the valve element 124 off the top of the tube. When the controller member 98 moves downwardly and separates from the valve element 124, the input chamber and output chambers are communicated via the passage 120 but are sealed from the atmosphere.

When the seat 122, the valve element 124 and vent 126 are all in a common plane as seen in FIG. 1, the input and output chambers are sealed from each other and from ambient pressure. In this position, a static pressure is maintained in the output chamber 96.

The communication of a positive signal pressure to the input chamber 94 applies a force to the diaphragm 90 urging it and the controller member 98 downwardly. Pressure in the output chamber 96 on the other hand, applies a force to the diaphragm 90 and control member, urging them upwardly. Expansion of the aneroid capsule 62 applies force to the controller member 98 also urging it upwardly. As indicated above, when the upwardly directed forces (exerted by the output pressure and the aneroid capsule) are balanced by the downwardly directed force exerted by signal pressure in the input chamber, the controller member 98 assumes the position shown in FIG. 1, that is, the position at which the input and output chambers 94, 96 are sealed from each other and from the ambient pressure port 82. For a given aneroid capsule extension the output pressure is a function of input pressure. Thus, if the engine is operated at a fixed altitude, the output pressure will vary with the applied input pressure.

As seen in FIG. 1, the force transmitting arm 70 defines a first moment arm, indicated by the reference character $M_1$, between the adjustment screw 72 and the pivot pin 152. A second moment arm, designated by the reference character $M_2$, is defined between the transverse pin 110 (by which the operating rod 100 is attached to the arm 70) and a pivot pin 152. With the disclosed construction, the force exerted by the aneroid capsule 62 and transferred to the controller 98 is amplified. The amplification ratio is determined by the ratio between the moment arms $M_1/M_2$. It should be apparent that the application ratio can be modified by changing the ratio of the moment arms defined, i.e., by changing the location of the V-shaped mounting recess 70a.

The overall control system operates as follows. When sufficient exhaust flow is generated by the engine to drive the turbocharger, a positive pressure will gradually develop in the intake system 12. This positive pressure 50 is communicated to the input port 80 of the boost regulator via the conduit 86. The input pressure applied to the diaphragm 90 will urge the diaphragm and controller member 98 downwardly. If the force applied by the input pressure is sufficient to overcome the upwardly directed forces applied by pressure in the output chamber 96 and/or by the aneroid capsule 62, the controller member will move downwardly and disengage the valve element 124 allowing the pressurized air to flow from the input chamber 94 to the output chamber 96 via the passage 120. When the pressure in the output chamber 96 is sufficient to counter the pressure in the input chamber, the controller member will move upwardly and reengage the valve element 124 thus sealing the input chamber 98 from the output chamber 96. Should the pressure in the input chamber decrease, the unbalanced forces on the diaphragm 90 and the controller member 94 will cause the controller member to move upwardly, lifting the valve element 124 off the vent tube 126 allowing pressure in the output chamber 96 to vent to atmosphere through the port 82. When the forces are again balanced, the controller member 98 will move downwardly until the valve element 124 reengages the vent tube 126 again sealing the input and output chambers from each other and from atmosphere.

The aneroid capsule 62 varies the biasing force on the controller member 98 as changes in atmospheric or barometric pressure are encountered. As the altitude increases, the aneroid capsule 62 expands thus increasing the upwardly directed force on the controller member 98. In order to balance this added biasing force at increased altitude, an increase pressure must be communicated to the input chamber 94. Put another way, as the altitude increases, the added biasing force applied to the controller member 98 by the aneroid capsule, produces a smaller output pressure in the output chamber 96 for a given input pressure.

In the preferred embodiment the reduction in output pressure that occurs at increasing altitude compensates for the reduction in the biasing force applied to the wastegate diaphagm 34 by ambient pressure. As discussed above, the diaphragm which is connected to the wastegate valve is biased downwardly (as viewed in FIG. 1) by the combination of the spring 42 and atmospheric pressure communicated through the port 40. As the altitude increases, the pressure exerted by the ambient is reduced and thus a smaller signal pressure, communicated via the conduit 86, will cause the wastegate valve to open and divert exhaust gas around the turbine housing 19. With the present invention, the output pressure developed in the chamber 96 is reduced proportionately by the action of the aneroid capsule 62, the reduction corresponding to the reduction in the biasing force exerted on the diaphragm 34 by ambient pressure.

Consequently, the output of the turbocharger is not diminished when the vehicle is operated at higher altitudes.

In accordance with a feature of the invention, the action of the control valve assembly 60 maintains a predetermined extension in the aneroid capsule. As seen in FIG. 1, in the balanced position, the controller member 98 assumes a position in which the top of the vent tube 126, the valve seat 122 and valve element 124 are all in a common plane, regardless of the input and output pressures and the altitude at which the engine is operated. Changes in altitude are not manifested as substantial extensions of the aneroid bellows but instead are manifested as changes in a biasing force applied to the controller member 98. Even though the capsule may extend incrementally as the altitude increases, the increased extension is only temporary for as soon as a balanced condition is reestablished by the adjustment of pressures in the input and output chambers 94, 96, the controller member 98 will again return to the static position thus forcing the force transmitting arm 70 to assume the position shown in FIG. 1 and compress the aneroid capsule to its normal operating height. In short, altitude changes as sensed by the aneroid capsule are not manifested as substantial displacements of the controller member 98. With the present invention, the air and hysteresis effects often experienced with aneroid elements is obviated.

The present invention also provides additional advantages. Since a static output pressure is generated in the output chamber 96 for a given input signal pressure and ambient pressure, intake manifold pressure is not consumed by the controller. As described above, in some prior art devices, the wastegate signal is modulated and hence the intake system pressure is constantly bled to atmosphere in order to produce a continuously modulated wastegate signal. The disclosed boost regulator 50 does not continually bleed air in order to maintain a continuous wastegate signal.

With the present invention, the possibility of dirt and other contaminants entering the regulator mechanism is reduced because very little air flow is necessary through the regulator to produce the output signal as compared to modulating controllers. As a result, the disclosed construction should prove reliable and require minimum maintenance. It should also be noted that when the intake system is operating in a negative pressure, i.e., during deceleration, the communication of a negative signal pressure to the input chamber 94 causes the controller 98 to raise and seal the input chamber 50 from the output chamber 96 and the ambient pressure port 82. Under vacuum conditions, no air flow occurs through the boost regulator, again reducing the possibility of contaminants entering the regulator.

Figure 3:
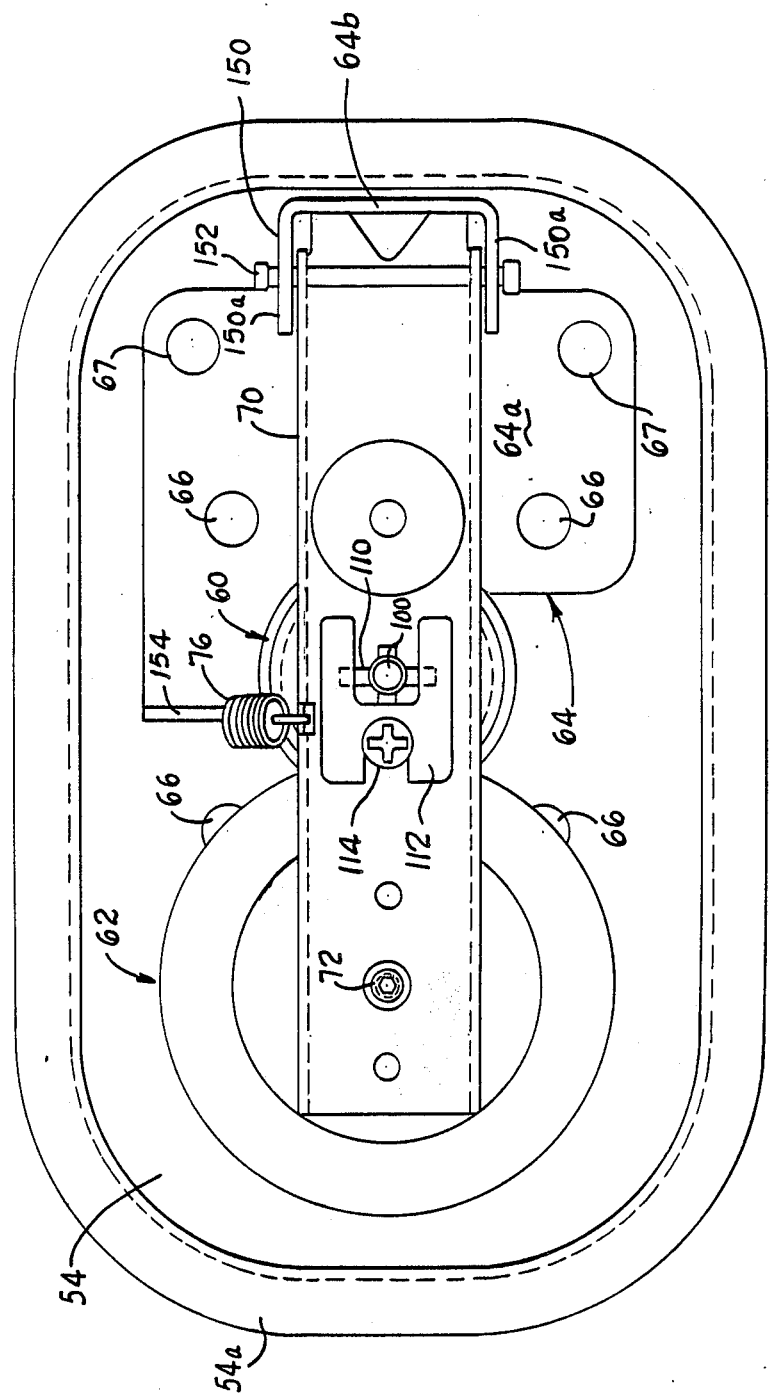

According to a feature of the invention, the regulator 50 is easily fabricated and relatively inexpensive. The valve assembly casing 92 and the port body 78 can be molded from inexpensive material such as plastic using well known methods. With the disclosed construction, the valve assembly 60 can be assembled separately and then mounted to the base 54 of the regulator housing 52. As seen in FIG. 3, rivets 66 can be used to secure the valve assembly in position. It should be noted that the rivets 66 extend through the base 54, the valve assembly casing 92 and the port structure 78 and, when assembled, clamp the members together. The control diaphragm 90 is sealingly clamped between a flange 92b of the casing 92 and the port structure 78. The rivets 66 not only serve as a securement for the valve assembly 60 to the regulator housing but also serve to maintain the assemblage of the valve assembly itself. After the valve assembly is mounted to the base 54, the operating rod 100 is secured to the force transmitting arm 70.

As seen best in FIG. 3, the pivot mount 64 for the force transmitting member 70 comprises a base or platform 64a and an upwardly extending bracket 64b which defines the pivot for the force transmitting arm 70. The base 64a is secured to the regulator housing 54 by the rivets 67 and the rivets 66.

The bracket 64b defines a U-shaped pivot bracket 150 having a transverse dimension slightly larger than the width of the force transmitting arm 70. The pivot pin 152 extends between arms 150a of the pivot bracket 150 and through the force transmitting arm 70. The ends of the pins are swaged to maintain the position of the pivot pin 152 in the pivot bracket.

As seen in FIG. 3, the pivot mount also defines an integral spring mount 154 that extends upwardly towards the force transmitting arm. The inclusion of the spring mount 154 as part of the pivot mount 64 simplifies the construction, obviating the need for a separate spring mounting member.

In short, in the preferred and illustrated embodiment, the regulator 50 can be fabricated using inexpensive manufacturing methods. After the housing base 54 is formed, the valve assembly 60, which can be assembled separately from the housing, is mounted to the base 54 as is the pivot mount 64 and associated force transmitting arm 70. As described above, the aneroid capsule 62 is threadedly received by a boss 68 in the base. With the application of six fasteners such as rivets, the valve assembly 60 and the force transmitting arm 70 are securely and permanently mounted. The rivets not only maintain the mounting positions of the valve assembly and force transmitting arm but also serve to maintain the assemblage of the valve assembly itself.

Although the invention has been described with a certain degree of particularity, it should be understood that various changes can be made to it by those skilled in the art without departing from the spirit or scope of the invention as hereinafter claimed.

I claim:

1. An altitude compensating turbocharger controller for an internal combustion engine, comprising:
   (a) a suport housing;
   (b) an aneroid bellows connected to said housing;
   (c) a control valve assembly having a pressure input for receiving a pressure signal indicative of an output pressure of a turbocharger, a vent port connected to ambient air pressure, a pressure output port, and valving structure defining a differential pressure responsive means movable from a predetermined position to alter communication between said output port and one of said input and vent ports to change the output pressure, said valving structure acted upon by differential pressure forces whose magnitude varies depending on sensed changes in ambient atmospheric pressure and the input pressure;
   (d) a force transmitting lever pivotally supported by said housing and operatively connected to said aneroid bellows and said valving structure, said lever operative to transmit and amplify force between said aneroid bellows and said valving structure;

(e) said force transmitting lever effective to transmit biasing forces generated by said bellows to said valving structure in response to sensed atmospheric pressure, said output pressure changing to produce a differential pressure force acting on said valving structure to oppose said bellows generated biasing force, said differential pressure force reacting against said bellows force via the force transmitting lever to limit the degree of extension and retraction of said bellows to incremental amounts from a predetermined degree of extension.

2. A turbocharger control system for an internal combustion engine, comprising:
  (a) an exhaust driven turbocharger including a driven portion connected to an exhaust stream from said engine and a compressor portion disposed in an intake stream of said engine for pressurizing said intake stream under predetermined engine operating conditions;
  (b) a wastegate disposed in said exhaust stream and operative to control the communication of exhaust gas to said driven portion of said turbocharger, said wastegate operative to divert exhaust gas from said turbocharger when said intake stream is pressurized to a predetermined pressure by said compressor portion;
  (c) a wastegate controller responsive to changes in ambient atmospheric pressure for controlling the operation of said wastegate, said wastegate controller comprising:
    (i) a housing mounting an aneroid capsule;
    (ii) said housing defining an input port communicating with said intake stream, downstream of said compressor portion of said turbocharger, an ambient pressure port communicating with ambient atmospheric pressure, and an output port communicating with said wastegate;
    (iii) a controller member for controlling the communication of the input port with the ambient pressure port and the output port;
    (iv) a force transmitting lever pivotally supported by said housing and operatively connected to said aneroid capsule and said controller member and operative to transmit and amplify forces generated by said aneroid capsule to said controller member, the forces applied to said controller member by said force transmitting lever being balanced by pressure at said input port and pressure at said output port such that pressure at said output port varies in accordance with changes in altitude for a given input port pressure.

3. An altitude compensating turbocharger controller for an internal combustion engine, comprising:
  (a) a support housing;
  (b) an aneroid capsule mounted in said housing, said capsule incrementally expansible in response to sensed changes in ambient atmospheric pressure;
  (c) a valve assembly for controlling the communication of a turbocharger output related signal pressure to a wastegate input port;
  (d) said valve assembly including a controller movable from a balanced position at which said wastegate input port is sealed from both atmospheric pressure and said signal pressure to a first position at which said signal pressure is communicated to said input port or a second position at which said input port is communicated with ambient atmospheric pressure;
  (e) a force transmitting lever pivotally supported by said housing and operatively connected to said aneroid capsule and said valve assembly;
  (f) said force transmitting operative to transmit and amplify biasing forces to said controller generated by said aneroid capsule in response to sensed changes in atmospheric pressure, said biasing forces modifying the pressure at said wastegate input port for a given signal pressure.

4. A turbocharger controller for an internal combustion engine, comprising:
  (a) structure defining an input port for receiving a signal indicative of an output pressure of a turbocharger and an output port for connection to a turbocharger wastegate;
  (b) a controller for controlling the pressure at said output port as a function of said input signal;
  (c) an aneroid capsule operative to produce a signal indicative of sensed atmospheric pressure;
  (d) lever means for communicating and amplifying said aneroid capsule signal to said controller;
  (e) balancing means for receiving forces generated by said input signal, aneroid capsule signal and the pressure at said output port including means for adjusting said pressure at said output port to compensate for the force exerted by said aneroid capsule signal.

5. The turbocharger controller of claim 4 wherein said aneroid capsule signal is generated by changes in extension of said aneroid capsule.

6. The turbocharger controller of claim 5 wherein said changes in aneroid capsule extension are transmitted to said controller by a force transmitting arm.

7. The controller of claim 4 wherein said signal received by said input port is said output pressure of said turbocharger.

8. A boost regulator for controlling a signal pressure communicated to a wastegate actuator, comprising:
  (a) a support housing;
  (b) a movable diaphragm mounted in said housing including a region for receiving a pressure signal indicative of a turbocharger output pressure turbocharger and a second region exposed to an output pressure developed in an output chamber in response to said turbocharger output pressure and sensed atmospheric pressure;
  (c) a controller carried by said diaphragm and including valve means for controlling the fluid communication between said first region and said second region and between said second region and an ambient pressure port;
  (d) an atmospheric sensing means including amplifying lever means for applying a force, related to atmospheric pressure, to said controller such that changes in atmospheric pressure are manifested as a change in biasing force on said controller.

9. The apparatus of claim 8 wherein said atmospheric sensing means comprises an aneroid capsule, the extension of which changes incrementally in response to sensed changes in atmospheric pressure.

10. The apparatus of claim 8 wherein said first region of said diaphragm at least partially defines an input chamber in fluid communication with said turbocharger output pressure and said second region at least partially defines an output chamber in fluid communication with said wastegate actuator.

11. An altitude compensating internal combustion engine turbocharger boost pressure controller comprising:
  (a) structure defining an input port for receiving a signal fluid pressure indicative of a turbocharger boost pressure;
  (b) means for generating a static output fluid pressure at an output port which varies as a function of said signal pressure, said means including a shiftable valve member acted upon by pressure forces created by said signal pressure and said output fluid pressure and operative to adjust the magnitude of said static output fluid pressure in response to changes in the signal pressure magnitude;
  (c) an aneroid capsule responsive to changes in ambient atmosphere pressure and operative to produce a biasing force related to sensed changes in said atmospheric pressure, and
  (d) lever means for transmitting and amplifying said biasing force to said valve member to alter the magnitude relationship between said signal pressure and said static output pressure in relation to changes in sensed atmospheric pressure.

12. The turbocharger controller of claim 6 wherein said force transmitting arm defines a first moment arm between a pivot and said aneroid capsule and a second moment arm, different from said first moment arm, between said pivot and said controller.

13. The apparatus of claim 12 wherein said first moment arm is longer than said second moment arm.

14. The turbocharger controller of claim 6 wherein said force transmitting arm is pivotally connected to a housing member at one end and operatively connected to said aneroid capsule near another end and said controller is operatively connected to a location on said arm intermediate said ends.

15. A boost regulator for controlling a signal pressure communicated to a wastegate actuator, comprising:
  (a) a support housing defining a base portion;
  (b) a control valve assembly mounted to said base portion, said control valve assembly comprising:
    (i) a port body defining integral input, output and ambient pressure ports;
    (ii) an enclosure member enclosing control valve components located within said control valve assembly;
    (iii) a control diaphragm captured and sealingly engaged between said port body and said enclosure member;
    (iv) means securing said port body and enclosure member together and to said base portion of said regulator housing;
    (v) a lever arm pivotally connected at one end to said housing and extending into abutting engagement with an aneroid capsule mounted in said housing, said lever arm defining a first moment arm between said aneroid capsule and a pivot axis about which said lever is pivotally connected to said housing;
    (vi) said control valve assembly including an operating rod extending through an opening in said enclosure member and operatively connected to said lever arm at a location intermediate said pivot axis and said aneroid capsule such that a second moment arm is defined, smaller than said first moment arm.

16. The regulator of claim 15 in which said port body and enclosure member are molded components.

17. The regulator of claim 15 wherein a plurality of fasteners concurrently clamp said enclosure member to said port body and secure said enclosure member and port body to said base portion of said regulator housing.

18. The regulator of claim 17 wherein the pivot axis for said lever is defined by bracket structure including a support platform secured to said base portion of said regulator housing.

19. The regulator of claim 18 wherein said bracket structure further defines an upstanding spring mount for connection with a biasing spring for biasing said lever arm towards said aneroid capsule.

20. The regulator of claim 17 wherein said support platform is secured to said base portion of said regulator housing by at least some of the fasteners used to secure said control valve assembly to said base portion.

21. The regulator of claim 15 further comprising a seal means including a seal skirt sealingly engaging a region on said enclosure member near said opening, said seal means operative to seal an interior region defined within said enclosure member from another region defined by said regulator housing when said operating rod reciprocates in response to control signals.

22. The turbocharger controller of claim 1 wherein said pressure input port is in fluid communication with an intake stream of said internal combustion engine, said intake stream being pressurized under predetermined engine operating conditions by an exhaust driven turbocharger that includes a driven portion connected to an exhaust stream from said engine.

23. The turbocharger controller of claim 22 wherein said pressure output port is in fluid communication with a wastegate actuator, said wastegate actuator operative to control the operation of a wastegate that is disposed in an exhaust stream of said internal combustion engine, said wastegate including means for controlling the communication of exhaust gas to said exhaust driven portion of said turbocharger.

24. A turbocharger control system for an internal combustion engine, comprising:
  (a) a controller responsive to changes in ambient atmospheric pressure for controlling the operation of a turbocharger, said controller including:
    (i) a housing mounting an aneroid capsule;
    (ii) said housing defining an input port communicating with an engine intake stream, downstream of a compressor portion of a turbocharger, an ambient pressure port communicating with ambient atmospheric pressure, and an output port at which a control pressure is maintained under predetermined operating conditions;
    (iii) a controller member for controlling the communication of the input port with the ambient pressure port and the output ports;
    (iv) a force transmitting lever arm pivotally supported by said housing and operatively connected to said aneroid capsule and said controller and operative to transmit and amplify forces generated by said aneroid capsule to said controller member, the forces applied to said controller member by said force transmitting lever arm being balanced by pressure at said input port and pressure at said output port such that pressure at said output port varies in accordance with changes in altitude for a given input port pressure;
  (b) a wastegate means communicating with said output port.

25. The turbocharge control system of claim 23 wherein said turbocharger is exhaust driven and includes a driven portion connected to an exhaust stream for said engine and said compressor portion is operative to pressurize the intake stream under predetermined engine operating conditions.

26. The turbocharger control system of claim 25 wherein said output port communicates with a wastegate actuator forming part of said wastegate means, said wastegate means being operative to control the communication of exhaust gas to said driven portion of said turbocharger and being further operative to divert exhaust gas from said turbocharger when said intake stream is pressurized to a predetermined pressured by said compressor portion.

* * * * *